Dec. 1, 1942.  J. E. WOODS  2,303,416
METHOD OF PRODUCING HEAT EXCHANGE APPARATUS
Filed Jan. 31, 1940  2 Sheets-Sheet 1
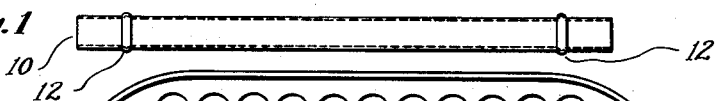
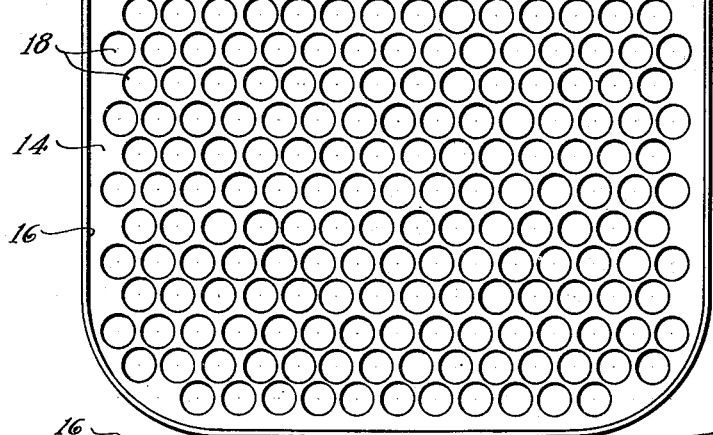
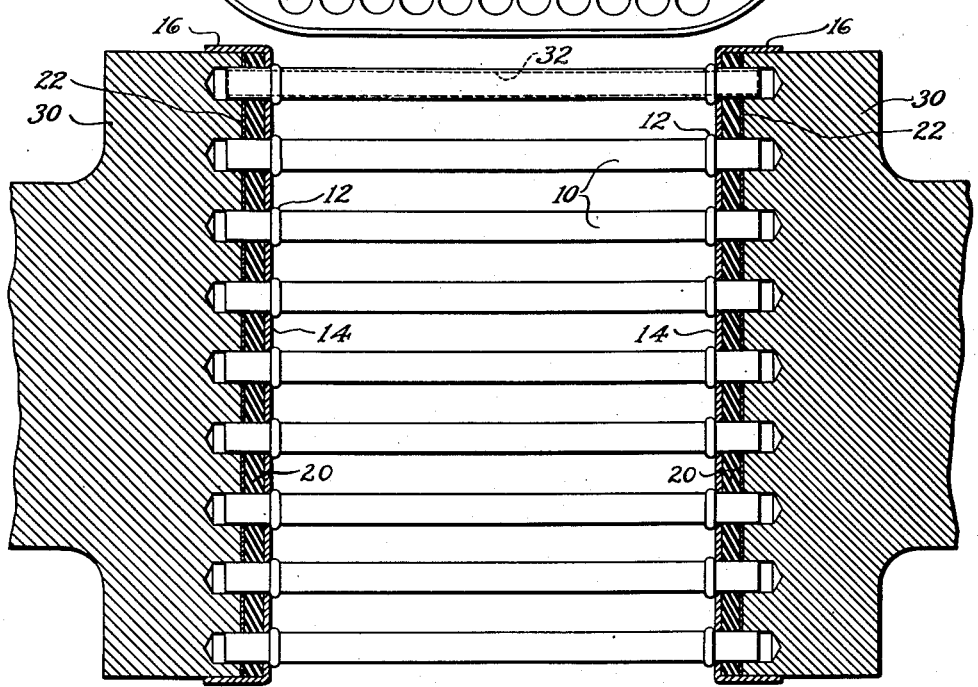

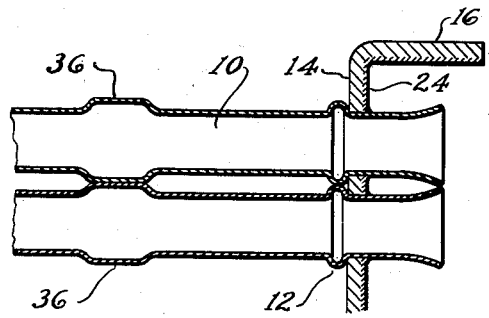
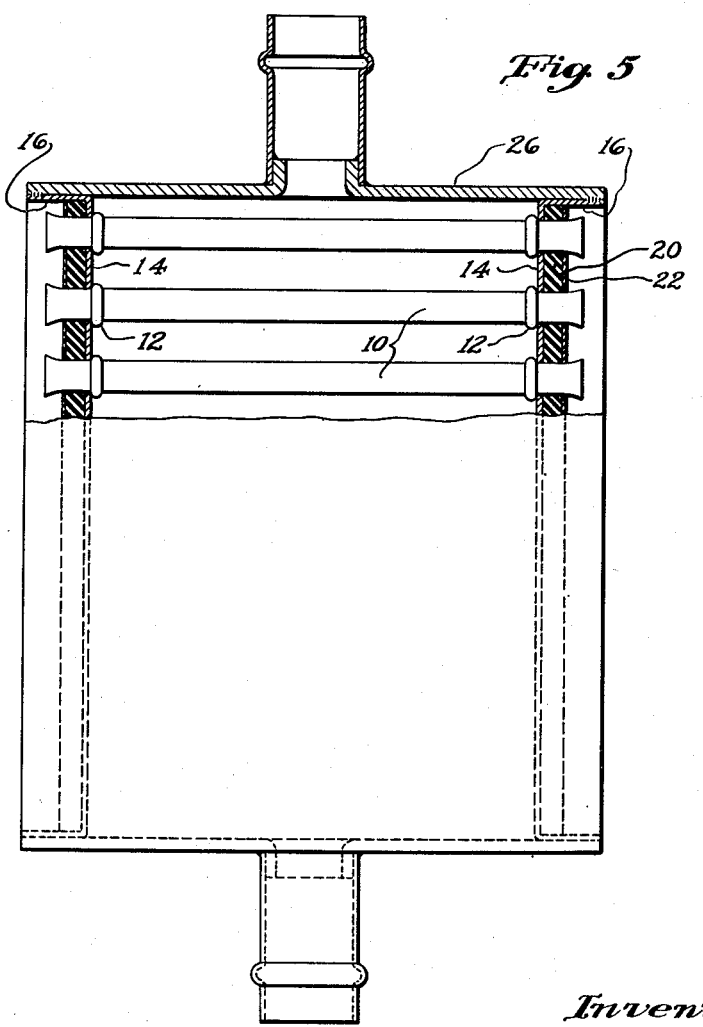

Patented Dec. 1, 1942

2,303,416

UNITED STATES PATENT OFFICE 2,303,416

METHOD OF PRODUCING HEAT EXCHANGE APPARATUS

John E. Woods, Brookline, Mass., assignor to Clifford Manufacturing Co., Boston, Mass., a corporation of Delaware Application January 31, 1940, Serial No. 316,592

2 Claims. (Cl. 18—59)

The present invention relates to a method of producing heat exchange apparatus, more particularly adapted for airplane radiators and the like.

The purpose of the invention is to provide a simple and effective method of producing such radiators designed to obviate the probability of isolated leaks in the production of such equipment.

In the drawings illustrating the preferred method of practicing the invention, Fig. 1 represents a tube provided with a positioning rib; Fig. 2 illustrates a flat header sheet into which the tube bundle is assembled; Fig. 3 illustrates the tube assembly with the oppositely disposed header sheets and with the layers of rubber-like bonding material assembled therewith; Fig. 4 is a view illustrating the assembly with metallic brazing compound; and Fig. 5 is the completed assembly with the enclosing shell and the tube ends outwardly flared.

In the illustrated embodiment of the invention I form a series of thin wall aluminum tubes 10, and thereafter provide each tube with circumferential positioning ribs 12, as indicated, in predetermined relation to the opposite ends of the tubes. I form aluminum header sheets 14 generally flat with upturned marginal flanges 16 and with spaced openings 18 for the reception of the tube ends therein. I have found that in producing the openings in the tube sheets by punching or otherwise, it is highly desirable and in fact necessary to adopt some method by which absolute registration of the openings in opposite or companion tube sheets shall be secured. This I accomplish by punching the tube sheets in pairs so that any slight irregularity in the spacing of the openings shall apply in the same manner to each sheet, thus insuring absolute parallelism of the tubes within the bundle when later assembled. Following this I assemble the tube sheets with the tube bundle, the positioning ribs locating the sheets and limiting the movement on the tubes. Either before or after assembly I assemble with each tube sheet a sheet of bonding material to be hereafter more fully described, and elevate the temperature of the assembly, including the bonding material, to a temperature necessary to vulcanize or braze the material as the case may be, and effectually bond the tubes to the sheets.

In one case I may employ a vulcanizable rubber substance such as "neoprene." This is preferably molded, provided with preformed openings, and initially assembled and located with respect to each tube sheet, together with a thin sheet of aluminum 22 overlying the neoprene sheet 20 and having openings registering therewith. Each tube sheet and the molded assembly of neoprene is then assembled with the tube bundle and is in condition to be bonded thereto by vulcanization under heat and pressure. Prior to such assembly and vulcanization the contacting aluminum surfaces of both the tube sheets and tubes are treated by painting or otherwise with a cement consisting of a mixture of chlorinated rubber and neoprene. This treatment follows a thorough cleaning of the aluminum surfaces by nitric acid or equivalent means. In the first or following coats chlorinated rubber predominates, the neoprene being on the order of 10% to 20%, whereas in subsequent coats the neoprene may predominate, with 10% to 20% of chlorinated rubber. In other words, successive coats starting with the predomination of chlorinated rubber, may gradually increase the percentage of neoprene until the latter predominates.

The treated assembly of tubes, header sheets and molded neoprene is then subjected to a vulcanizing temperature and pressure applied to the neoprene sheets by suitable pressure members 30 to cause flow of the neoprene into bonding engagement about the tubes. In order to sustain the tubes during vulcanization I may employ interior supporting rods 32, one of which is shown in Fig. 3. These rods fit the tube, prevent buckling under pressure, and may be readily removed after assembly. I have found in practice that the quality of the bond is markedly improved if care is taken to gradually elevate the temperature to the vulcanizing point with sufficient lag to permit both the vulcanizing material as well as the thin aluminum surfaces to come up to vulcanizing temperature simultaneously. Otherwise the subjection of the assembly to a region of vulcanizing temperature promptly raises the thin wall metallic surfaces to vulcanizing temperature with the cement applied thereto creating a tendency to the formation of a brittle bond which impairs the quality of the seal. I employ the outer aluminum sheet superimposed over the vulcanizable sheet to permit adherence of patching compounds of neoprene and the like in the event that isolated leaks develop during usage. This compound can be bonded to the aluminum sheet, whereas it cannot be bonded to the previously vulcanized neoprene sheet.

In the alternative method I provide a thin foil-like sheet of "Alclad" 24, which is a brazing alloy available for aluminum consisting generally of an alloy of aluminum and silicon, and having a melting point of 75° to 100° below that of the aluminum. The thickness of the sheet of brazing alloy must be comparably less than the thickness of the header sheet and tube walls in order that the proportion of brazing alloy shall be measurably less than the proportion of basic metal aluminum to be bonded. This alloy may be superimposed as a sheet on either side of the header sheet, or may be rolled into the aluminum sheet during manufacture and form a part thereof from which the header sheet may be fabricated directly as shown in Fig. 4. When this alloy with a suitable flux is elevated to a temperature representing the melting point of the brazing alloy, the latter flows into the openings about the tube ends, effectually bonding the tube ends without injury thereto. In using the aluminum alloy or otherwise I may find it desirable to form supporting bulges on the tubes midway between the ends, these bulges being shown at 36 and contacting when the tubes are assembled.

Any attempt to secure such a bond by immersion of the assembly into a molten bath of brazing compound or the like results in absorption of the tube ends within the molten alloy due to the greater preponderance of the brazing alloy as compared with the aluminum. Such a method, although satisfactorily employed for soft soldering copper tube radiation, is entirely impractical for aluminum tubes and the like, as by the same token the joining of copper tubes by high temperature brazing compound is impractical due to the close range of melting points of the brazing compound and tube material.

In either case, after assembly and sealing, the projecting ends of the tubes may be outwardly flared with any desired configuration to cause juxtaposition of the tube ends and reduction of head resistance on account of the flaring tube mouths, and finally the assembly of tubes is received within a shell 26, and the shell is joined to the marginal flanges on the tube sheets either by line welding or other suitable bonding means.

What is claimed is:

1. The method of making heat exchange apparatus which consists in assembling tubes in perforated header sheets, placing sheets of vulcanizable rubber-like material on the headers adjacent to the ends of the tubes, supporting the headers to resist pressure applied endwise of the tubes, and subjecting the assembly to heat and endwise pressure to vulcanize the rubber-like material and bond it to the tubes and headers.

2. The method of making heat exchange apparatus which consists in assembling tubes with circumferential positioning ribs in perforated header sheets, placing sheets of vulcanizable rubber-like material on the headers adjacent to the ends of the tubes, and subjecting the assembly to heat and endwise pressure to vulcanize the rubber-like material, the headers being supported against said pressure by the positioning ribs on the tubes.

JOHN E. WOODS.